United States Patent [19]

Krude

[11] 4,317,341
[45] Mar. 2, 1982

[54] UNIVERSAL JOINT

[75] Inventor: Werner Krude, Neunkirchen, Fed. Rep. of Germany

[73] Assignee: Uni-Cardan AG, Siegburg, Fed. Rep. of Germany

[21] Appl. No.: 88,823

[22] Filed: Oct. 26, 1979

[30] Foreign Application Priority Data

Nov. 10, 1978 [DE] Fed. Rep. of Germany ....... 2848813

[51] Int. Cl.³ .............................................. F16D 3/26
[52] U.S. Cl. ..................... 64/17 A; 64/32 F
[58] Field of Search ............... 64/17 R, 17 A, 17 SP, 64/32 F

[56] References Cited

U.S. PATENT DOCUMENTS

| 2,439,569 | 4/1948 | Hathorn | 64/17 A |
| 3,178,907 | 4/1965 | Lyons | 64/17 A |
| 3,881,324 | 5/1975 | Girguis | 64/17 A |
| 4,077,235 | 3/1978 | Kleinschmidt et al. | 64/17 A |
| 4,103,512 | 8/1978 | McElwain et al. | 64/17 A |
| 4,147,041 | 4/1979 | Girguis et al. | 64/17 A |

Primary Examiner—Ira S. Lazarus
Attorney, Agent, or Firm—Toren, McGeady & Stanger

[57] ABSTRACT

A universal joint includes a pair of yokes each having a pair of yoke arms with bores therein. Projecting portions of a trunnion cross extend into the bores of the yoke arms, and a number of bearings are arranged between the projecting portions of the trunnion cross and bearing sleeves which are secured within the yoke arm bores. An elastic seal extends over the radially outward end of each bore relative to the joint axis of rotation so as to close the outward sides of the bores and cover end faces of the projecting portions of the trunnion cross. A supply of lubricant can be contained between each end face and seal to be directed toward the bearings during operation of the joint, as a result of pressure exerted on the lubricant supply by the seal.

5 Claims, 8 Drawing Figures

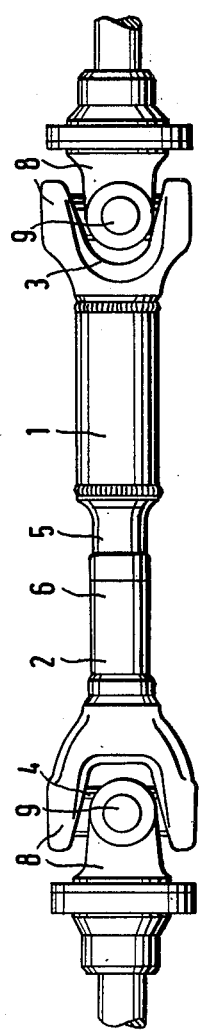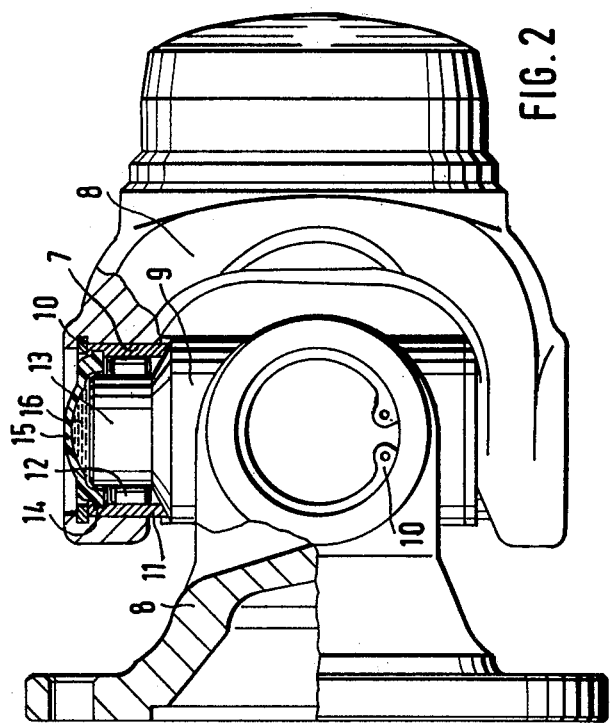

UNIVERSAL JOINT

BACKGROUND OF THE INVENTION

The present invention relates generally to universal joints including a trunnion cross which connects the yoke arms of a pair of yokes, and more particularly, to universal joints of the type including cylindrical bearing bodies or sleeves within bores through the yoke arms, and a number of bearings arranged between projecting portions of the trunnion cross and the bearing sleeves, the sleeves being sealed relative to the body of the trunnion cross by means of a contact seal.

Universal joints are known, such as disclosed in German Pat. No. 2,618,536, wherein a supply of lubricant is provided between an elastic seal which covers the body of the trunnion cross to ensure maintenance-free lubrication during the service life of the joint. This construction is, however, seldom used at the present time for relatively large trunnion crosses since, in such a case, the manufacture of such a joint is not economical. For example, trunnion crosses used in rolling mills have such a relatively large diameter that the costs of coating a plastics material thereon are so high that these crosses can no longer be economically manufactured.

An object of the present invention is to enable a trunnion cross of relatively large diameter to be provided in a universal joint which can be economically manufactured with the use of inexpensive materials but, nevertheless, allow for a supply of lubricant to ensure maintenance-free lubrication during the service life of the joint.

In accordance with the present invention, an elastic seal is provided which closes the ends of the bearing bodies or sleeves which face radially outwardly from the joint axis of rotation so that the seal covers the end face of the projecting portion of the trunnion cross within each yoke arm bore. A supply of lubricant can thereby be contained between the end face of each trunnion portion and the elastic seal.

An advantage of this construction resides in the protection by the elastic seal of the bearing sleeves against penetration of dirt and dust from the outside. The seal also makes possible a pressurized supply of lubricant so that the bearings are continuously provided with a sufficient amount of lubricant during the entire service life of the universal joint shaft.

In order to generate the pressure on the lubricant supply, the elastic seal is placed in the bearing body or sleeve before assembly of the trunnion cross in the yoke arms. The bearing sleeves, as well as a reservoir region adjacent the seal, are filled with lubricant and, after fastening the contact seal, are slid over the projecting portions of the trunnion cross so that excess lubricant flows into the reservoir region, the seal exerting a pressure in the opposite direction which subsequently provides the bearings to be lubricated with lubricant during operation. Oppositely directed centrifugal force, which acts on the lubricant supply during operation of the joint, is counteracted by the pressure provided on the lubricant supply by the seal, so that this centrifugal force has no influence on the lubrication of the bearings during the service life of the joints. It should be noted that universal joint shafts having large diameters of rotation must, as a rule, operate at relatively lower rates of rotational speed than shafts having smaller diameters of rotation, wherein such centrifugal force attains correspondingly smaller values.

In accordance with another feature of the present invention, the elastic seal can be secured within the bearing body or sleeve, or directly within the bore of the yoke arm.

In accordance with still another feature of the invention, the seal is provided with a thickened edge which engages an annular groove formed in the inner wall of the bearing sleeve. In such an embodiment, assembly of the joint including the mounting of the seal can be performed without any special equipment since only a groove extending over the inner circumference of the inner wall of the bearing sleeve is required, and the elastic seal engages this groove with a correspondingly formed annular projection.

In accordance with the invention a further embodiment of the seal is provided, the outer edge of the seal having an annular groove therein which is engaged by a corresponding projection on the radially outer side of the bearing sleeve. As a result, both sealing and securing of the elastic seal are ensured.

In accordance with yet another feature of the invention, a protective cap is also provided for holding the seal in the bearing sleeve, the cap having a cylindrical projection extending through a central opening in the seal to support the projecting portion of the trunnion cross. This enables centrifugal forces, which act on the lubricant during operation, to be absorbed without exerting an additional force on the lubricant supply.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a view of a universal joint shaft having a pair of universal joints at its ends;

FIG. 2 is an enlarged, partly sectional view of a trunnion cross with bearings and bearing sleeves arranged in yoke arms of one of the universal joints of FIG. 1;

DETAILED DESCRIPTION OF THE INVENTION

Figure 3:
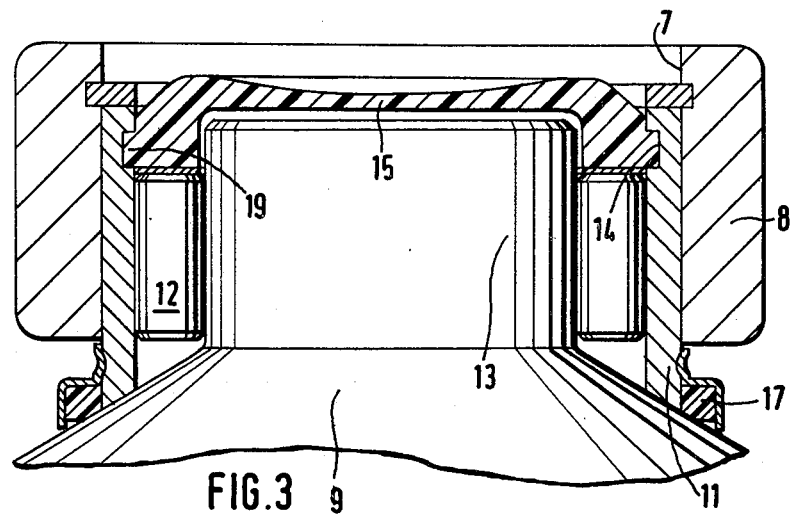
FIG. 3 is a further enlarged sectional detail view of a portion of the universal joint of FIG. 1, according to the present invention.

FIG. 1 illustrates a universal joint shaft including two coaxial universal joint portions 1 and 2 which carry universal joints 3 and 4 at their outer ends. Universal joints 3 and 4 have yoke arms 8 which are connected to each other through a trunnion cross 9. At its inner end, the universal joint shaft portion 1 is constructed as a solid shaft 5, and the universal joint shaft portion 2 is constructed as a hollow shaft 6. Solid shaft 5 and hollow shaft 6 are axially slidably connected to each other by meshing splines (not shown) so that relative rotation between the shafts 5 and 6 is prevented.

FIG. 2 shows the trunnion cross 9 which is received in bores 7 in the arms 8 of the yokes, and is restrained from movement in a radial direction relative to the axis of the joint shaft of FIG. 1 by means of a locking ring 10. This restraint of radial movement is effected by supporting one end of a bearing body or sleeve 11 on the body of the trunnion cross 9, and by arranging the locking ring 10 to engage the other end of the bearing sleeve 11. Movement of the trunnion cross 9 in the radial direction of the bores 7 is prevented by roller bearings 12 which roll on a projecting portion or trunnion 13 of the trunnion cross 9 within the sleeve 11. A flexible elastic seal 15 is fixed in a groove 14 on the cylindrical inner surface of the bearing sleeve 11, and a lubricant supply 16 is contained between the end face of the trunnion 13 and the elastic seal 15.

Figure 4:
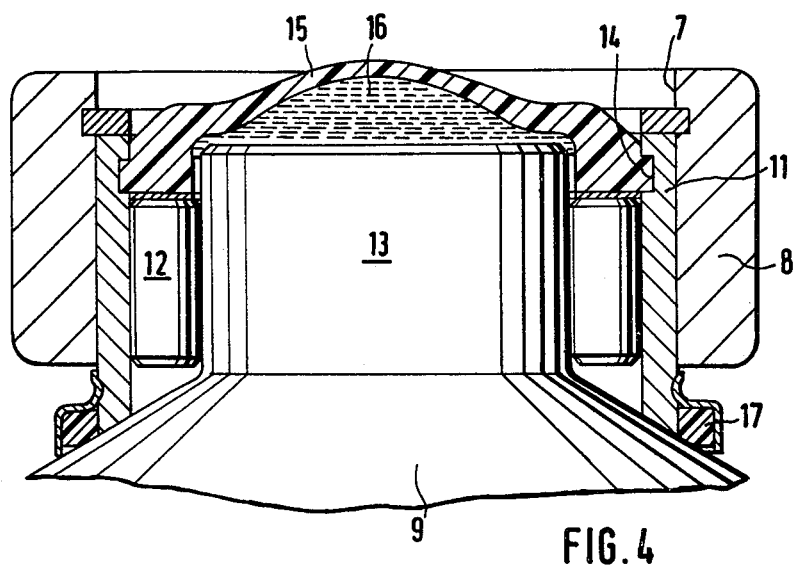
FIG. 4 is a view of the joint as in FIG. 3, showing a supply of lubricant contained in the joint.

FIGS. 3 and 4 show a part of the trunnion cross 9 which is arranged in bore 7 of yoke arm 8 with roller bearings 12 and the bearing sleeve 11. The area of contact between bearing sleeve 11 and the body of the trunnion cross 9 is sealed from the outside by a contact seal 17 in order to prevent dirt and dust from penetrating into the sleeve interior. The elastic seal 15 is arranged above the end face of the trunnion 13 and is fixed in the groove 14 in the bearing sleeve 11. As shown in FIG. 4, this embodiment enables the lubricant supply 16 to be contained between the end face of the trunnion 13 and the elastic seal 15, the seal 15 becoming inflated or distended and flexing outwardly so that the lubricant supply is pressurized as a result of stress initially exerted by the elastic seal, the lubricant thereby tending to flow continuously in the direction of roller bearings 12. On the other hand, FIG. 3 shows the elastic seal 15 in an empty or unfilled state, the lubricant supply 16 of FIG. 4 between the elastic seal 15 and the end face of the trunnion 13 having vanished. The seal is made up of an outer circumferential edge secured to the sleeve 11 and a radially inner part which extends over the end face of the trunnion 13. The inner part has a significantly reduced thickness as compared to the circumferential edge. As shown in FIG. 4, the inner part flexes outwardly when the lubricant supply is introduced between the seal 15 and the end face of the trunnion 13.

Figure 5:
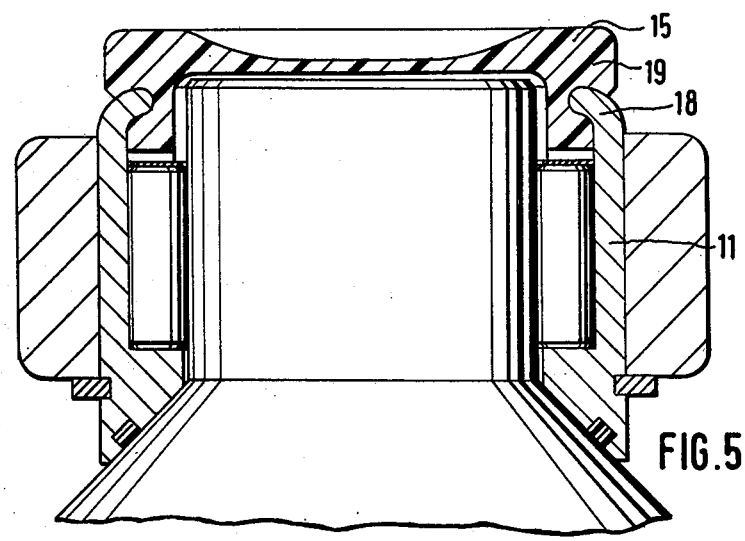
FIG. 5 is a sectional, detail partial view of a second embodiment of a universal joint according to the present invention.
Figure 6:
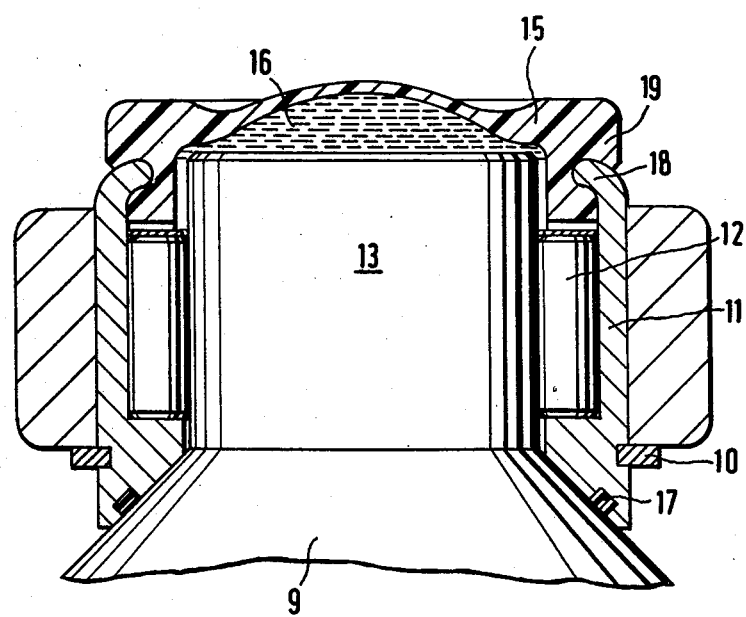
FIG. 6 is a view of the joint as in FIG. 5, showing a supply of lubricant contained in the joint.

FIGS. 5 and 6 show another embodiment of the present invention. Elastic seal 15 is provided with a thickened edge 19 about its outer circumference, edge 19 having an annular groove therein. Seal 15 is secured to the bearing sleeve 11 by a projection 18 on the sleeve 11 which engages the annular groove in the thickened edge 19 of the elastic seal. Also, in this embodiment, the area of contact between the bearing sleeve 11 and the body of the trunnion cross 9 is sealed from the outside by contact seal 17. Locking ring 10 is arranged on the side of the yoke arm which faces toward the axis of rotation of the joint shaft. FIG. 5 shows the condition of the joint when the lubricant supply has vanished, while FIG. 6 illustrates lubricant from the supply 16 being moved in the direction of the roller bearings 12 resulting from the fact that the lubricant supply 16 between the elastic seal and the end face of the trunnion 13 is under an initial stress.

Figure 7:
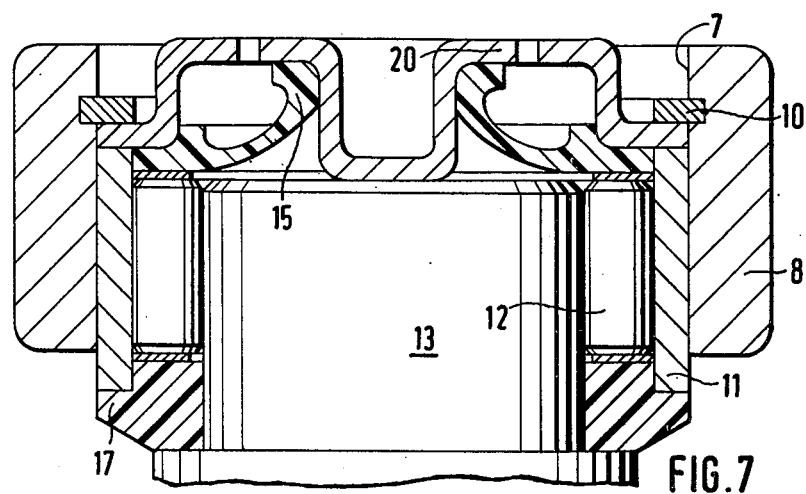
FIG. 7 is a sectional, detail partial view of a third embodiment of a universal joint according to the present invention.
Figure 8:
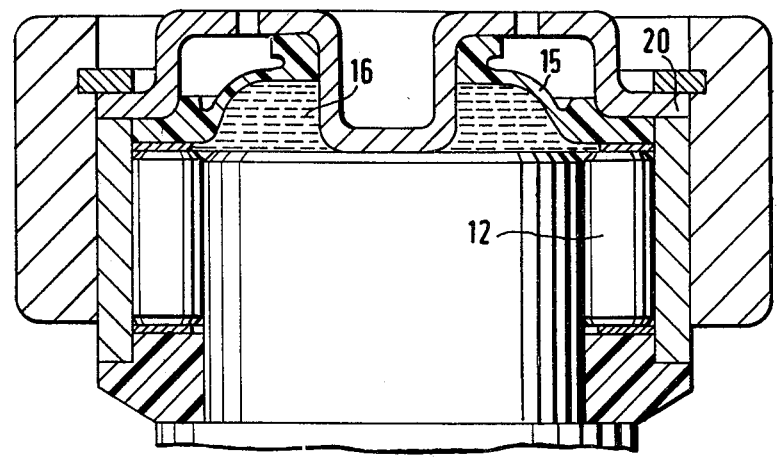
FIG. 8 is a view of the joint as in FIG. 7 showing a supply of lubricant contained in the joint.

FIGS. 7 and 8 show a third embodiment of the present invention in which the projecting portion or trunnion 13 of the trunnion cross 9 is arranged with its end face in bore 7 of yoke arm 8, the bore also containing roller bearings 12 and bearing sleeve 11. A protective cap 20 is provided which extends over the end face of trunnion 13, the cap being secured at its outer circumferential edge between the bearing sleeve 11 and the locking ring 10. Cap 20 protects the annularly formed elastic seal 15 from the outside and, moreover, serves as an abutment for the seal 15. Cap 20 also has a central cylindrical portion which extends through a central opening in the seal 15 to support or contact the end face of the trunnion 13. FIG. 8 shows the lubricant supply 16 being maintained under an initial stress by means of the seal 15 so that pressure is continuously exerted on the lubricant in the direction of the roller bearings 12. This seal corresponds in principle to the seals already discussed in connection with FIGS. 3 to 6.

While specific embodiments of the invention have been shown and described in detail to illustrate the application of the inventive principles, it will be understood that the invention may be embodied otherwise without departing from such principles.

What is claimed is:

1. A universal joint comprising a pair of yokes each of which includes a pair of arms having bores therein, a trunnion cross including a main body and projecting portions extending radially outwardly from said main body, each said projecting portion extends at least partly through one of said bores and has an end face spaced outwardly from said main body, a bearing sleeve in each of said bores which is restrained from movement in the axial direction of said bore, a plurality of bearings arranged within each said bearing sleeve and disposed between said bearing sleeve and said projecting portion of said trunnion cross, and a flexible elastic seal extending across the radially outward end of each said bearing sleeve relative to said main body for closing said outward end and covering said end face of said projecting portion of said trunnion cross located within said bearing sleeve, each said elastic seal comprising an outer circumferential edge part secured to said bearing sleeve and a radically inner part extending at least partly across said end face, said inner part having a thickness significantly less than said circumferential edge part so that said inner part flexes outwardly when a supply of lubricant is introduced between said end face and seal, whereby said seal exerts pressure on the lubricant supply so that the lubricant is pressurized and is directed toward said bearings.

2. A universal joint according to claim 1, wherein said seal is fixed over its outer circumferential edge to said yoke arm within said bore.

3. A universal joint according to claim 1, wherein said bearing sleeve has an annular groove in its inner wall and said outer circumferential edge is secured in said groove.

4. A universal joint according to claim 1, wherein said bearing sleeve has an annular projection on the radially outward end thereof and said seal has an annular groove formed in said outer circumferential edge to engage said projection.

5. A universal joint according to claim 1, including a protective cap for securing said seal to said bearing sleeve, said seal having a central opening through said inner part and said cap having a cylindrical projection extending centrally thereof through the opening in said seal to contact said projecting portion of said trunnion cross.

* * * * *